(12) United States Patent
Alayli

(10) Patent No.: US 11,281,720 B2
(45) Date of Patent: *Mar. 22, 2022

(54) EFFICIENT AND SCALABLE TIME-SERIES DATA STORAGE AND RETRIEVAL OVER A NETWORK

(71) Applicant: Hydrolix Inc., Portland, OR (US)

(72) Inventor: Hasan Alayli, San Francisco, CA (US)

(73) Assignee: Hydrolix Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,870

(22) Filed: Sep. 23, 2019

(65) Prior Publication Data

US 2020/0372071 A1 Nov. 26, 2020

Related U.S. Application Data

(63) Continuation of application No. 16/422,172, filed on May 24, 2019, now Pat. No. 10,423,662.

(51) Int. Cl.
*G06F 16/901* (2019.01)
*G06F 16/908* (2019.01)
*G06F 16/903* (2019.01)
*G06F 16/9035* (2019.01)

(52) U.S. Cl.
CPC ......... *G06F 16/901* (2019.01); *G06F 16/908* (2019.01); *G06F 16/9035* (2019.01); *G06F 16/90335* (2019.01)

(58) Field of Classification Search
None
See application file for complete search history.

(56) References Cited

U.S. PATENT DOCUMENTS 9,471,657 B1 * 10/2016 Xiao ............... G06F 16/27
2007/0198591 A1 * 8/2007 Teng ............. G06F 16/2282
2015/0081389 A1 * 3/2015 Dereszynski ...... G06Q 30/0204
705/7.33

(Continued)

OTHER PUBLICATIONS

Beaver, "Efficient multiparty protocols using circuit randomization," CRYPTO, 1991.

(Continued)

*Primary Examiner* — Wilson Lee
(74) *Attorney, Agent, or Firm* — David H. Judson

(57) ABSTRACT

Time-series columnar-based information is received and indexed in a compute infrastructure for cost-effective cloud-based object storage. The approach leverages a file format that enables highly-performant search and retrieval of the data stored in the cloud. In operation, an indexer receives the time-series information, indexes that information according to the file format, and forwards the indexed information for storage to the object store, where it is stored as a set of time-based partitions. A partition comprises a set of files, namely, a manifest file, a data file, and an index file. These files are structured as a compact instance of a set of raw unstructured data that comprises the given partition. Highly-performant information retrieval is enabled in response to a time-bounded query, because operations at a query peer (with respect to one or more partitions) are carried out in real-time during query processing and without requiring retrieval of the data file as a whole.

8 Claims, 2 Drawing Sheets

(56) References Cited

U.S. PATENT DOCUMENTS

| | | | |
|---|---|---|---|
| 2016/0299952 A1* | 10/2016 | Cialini | G06F 16/27 |
| 2016/0371328 A1* | 12/2016 | Li | G06F 16/24554 |
| 2018/0089262 A1* | 3/2018 | Bhattacharjee | G06F 16/24532 |
| 2018/0089312 A1* | 3/2018 | Pal | G06F 16/2465 |
| 2019/0147084 A1* | 5/2019 | Pal | G06F 40/205 707/769 |
| 2019/0258637 A1* | 8/2019 | Bhattacharjee | G06F 16/24549 |
| 2019/0310977 A1* | 10/2019 | Pal | G06F 16/2228 |

OTHER PUBLICATIONS

Ben-Or, et al, "Completeness Theorems for non-cryptographic fault-tolerant distributed computation," STOC, 1988.

Bogdanov, et al, "Sharemind: A framework for fast privacy-preserving computations," ESORICS, 2008.

Charikar, et al, "Finding frequent items in data streams," Theoretical Computer Science, 312(1), 2004.

Catrina, et al, "Secure computation with fixed-point numbers," International Conference on Financial Cryptography and Data Security, Springer 2010.

Damgard, et al, "Unconditionally secure constant-rounds multi-party computation for equality, comparison, bits and exponentiation," Theory of Cryptography, Springer 2006.

Dahl, et al, "On secure two-party integer division," International Conference on Financial Cryptography and Data Security, Springer 2012.

Halko, et al, "Finding structure with randomness: probabilistic algorithms for constructing approximate matrix decompositions," SIAM Review, 53(2), 2011.

Kamara, et al, "Outsourcing multi-party computation," IACR Cryptology ePrint Archive, 2011.

Laurie, et al, "Quality control and quality assurance in genotypic data for genome-wide association studies," Genetic Epidemiology, 34(6), 2010.

Markstein, "Software division and square root using Goldschmidt's algorithms," Proceedings of the 6th Conference on Real Numbers and Computers, vol. 123, 2004.

* cited by examiner

EFFICIENT AND SCALABLE TIME-SERIES DATA STORAGE AND RETRIEVAL OVER A NETWORK

BACKGROUND OF THE INVENTION

Technical Field

This application relates generally to time series-based data storage and retrieval.

Background of the Related Art

Streaming data is data that is continuously generated by different sources. Data generated from certain data sources, such as devices in the Internet of Things (IoT), or IT services, include (or can be modified to include) a timestamp. Streamed time-series data of this type is being generated continuously, driving a need for new and efficient information storage and retrieval services. Known techniques for storing and retrieving time-series data include cloud-based object storage services (e.g., Amazon® S3, Google® Cloud, and the like). These services are advantageous, as theoretically they are highly-scalable and reliable. That said, as the volume of time-series data being stored to the cloud increases, information retrieval (e.g., for data analysis, etc.) becomes very difficult. The problem is exacerbated for OLAP (online analytical processing) applications, where reading a high volume of data records (e.g., for aggregation) is a common use case. The problem arises because reading from a remote storage is much slower than reading from a local storage, thereby requiring a different data storage and retrieval strategy to store and read the data records. Practically, the slowness derives from the requirement that every (theoretically local) disk seek is equivalent to an HTTP request over the network to the remote store, and local disk throughput is significantly higher than the throughput obtained from remote object store when requesting a single file. As data volumes continue to increase exponentially, efficient and cost-effective information storage and retrieval for the type of data is an intractable problem.

There remains a need to provide for new techniques for information storage, search and retrieval of time-series based data to address these and other problems of the known art.

BRIEF SUMMARY

According to this disclosure, time-series data and, in particular, time-series columnar-based information, is received and indexed in a compute infrastructure for cost-effective cloud-based object storage, preferably in a unique database file format that enables highly-performant search and retrieval of the data stored in the cloud. The database file format (referring to herein as an "HDX file") advantageously enables the compute infrastructure (indexing and information retrieval) to be separated from the remote storage, thereby enabling both to scale. Using the HDX file format, the data is stored in a much more cost-effective manner (in the cloud object store), while still enabling that data to be efficiently searched, accessed and retrieved back to the compute infrastructure as if were present locally.

In one embodiment, the compute infrastructure comprises several services including an indexer (for data ingest and storage), and a search engine (for query and information retrieval). The infrastructure may also include additional services to facilitate or support the information storage, search and retrieval operations. The compute infrastructure interoperates with a network-accessible remote store, such as a cloud-based object store. Typically, the cloud-based object store is managed by another entity (e.g., a cloud service provider). In operation, the indexer receives the time-series columnar-based information from a data source (as an input), indexes that information according to the database file format, and forwards the indexed information for storage to the cloud-based object store, where it is stored as a set of time-based partitions. Preferably, the information is stored across the cloud-based object store in directories, each of which include a set of files that comprise the HDX file format.

According to one aspect of this disclosure, the set of files preferably comprise a manifest file, a data file, and an index file. The manifest file includes a dictionary of data strings seen in a column during indexing of the information, together with byte-range data configured to selectively retrieve data from the data and index files. The data file stores column data seen during the indexing, and the index file contains a listing (e.g., a posting-list) for each data string in the manifest file. In this approach, the column data is stored in the data file in contiguous byte-ranges. As data is streamed into the compute infrastructure, it is continuously processed by the indexer and transferred to cloud-based object store, where it is stored in the set of time-based partitions and according to the HDX file format.

Information search and retrieval is carried out by the search service. In one embodiment, the search service comprises a set of distributed query computing entities (or peers) that cooperate to respond to a particular search query. In operation, the search engine responds to receipt of a query, which typically includes at least a column identifier and a predicate. In response, the search engine queries a catalog service of the compute infrastructure that hosts a catalog of the time-based partitions (stored in object store). The catalog service identifies a list of partitions that are considered to contain data responsive to the query. To obtain the information from the remote object store, the search service first assigns each of a set of query peers to process a subset of the partitions identified in the list of time-based partitions returned from the catalog service. At a particular query peer, and for a given partition, preferably the following operations are then carried out.

First, the manifest file for the given partition is retrieved from the remote store. Then, for the posting-list data blocks in the index file so identified, one or more requests are then issued to the index file in the remote store to retrieve byte-ranges therein corresponding to the posting-list data blocks. The predicate specified in the query is then applied by finding an intersection of the posting-list data blocks, thereby identifying a set of data blocks in the data file for the given partition. For the set of data blocks in the data file so identified, one or more requests are then issued to the data file to retrieve the contiguous byte-ranges therein. The particular query peer receives the contiguous byte-ranges from the data file for the given partition, and it consolidates data obtained from processing the subset of the partitions assigned to the particular query peer. Data derived by all of the query peers (collectively) is then consolidated and returned as the response to the query.

The techniques herein provide for efficient storage (at the remote object store) and, in particular, because the manifest file, the index file and the data file for the given partition together comprise a compact instance of a set of raw unstructured data that comprises the given partition. Highly-performant information search and retrieval is enabled, at least in part because operations at the particular query peer (for each of the one or more partitions assigned to it) are carried out in real-time during processing of the query and without requiring retrieval of the data file as a whole. Further, because the query peers are configured to execute independently of the cloud-based object store, the number of query peers in the set can be scaled as necessary to process the query.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

Figure 1:
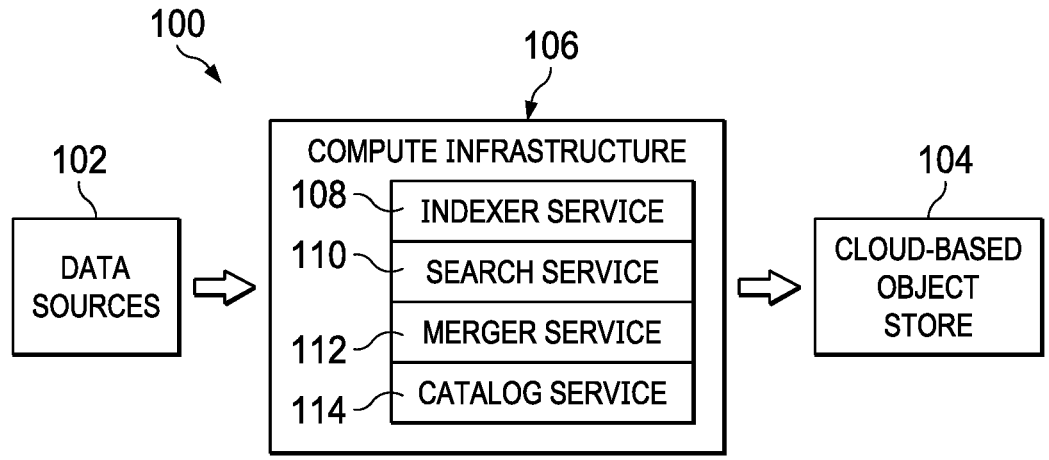
FIG. 1 depicts a high level architecture of a set of services that comprise a solution for time-series data compression and retrieval according to this disclosure.

FIG. 1 is an overall system 100 in which the techniques of this disclosure may be carried out. As noted, typically the data stored using the techniques herein is of a particular type, namely, time-series columnar-based information that is machine-generated. In this usual case, streamed time-series data of this type is being generated continuously from one or more data sources 102, such as IoT devices, web log sources, or the like. The nature and type of these data source(s) is not an aspect of this disclosure. Typically, the data is configured for storage in a network-accessible data store, such as a cloud-based object store 104. There may be multiple such object store(s), and the nature, number and type of these object store(s) is not an aspect of this disclosure either. Representative object storage is Amazon S3, Google Cloud, and many others. Stated another way, the techniques herein assume one or more data source(s) 102 of the time-series data, as well as the existence of one or more data store(s) 104 for that data, but these constructs typically are external to the compute infrastructure itself.

The compute infrastructure (or platform) 106 preferably comprises a set of services (or components) namely, an indexer service 108, a search service 110, a merger service 112, and a catalog service 114. One or more of these services may be combined with one another. A service may be implemented using a set of computing resources that are co-located or themselves distributed. Typically, a service is implemented in one or more computing systems. The computing platform (or portions thereof) may be implemented in a dedicated environment, in an on-premises manner, as a cloud-based architecture, or some hybrid. A typical implementation of the compute infrastructure is in a cloud-computing environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform of this disclosure may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Referring back to FIG. 1, the basic operation of the indexer service 108 is to receive the time-series information from the one or more data sources 102, and to convert this data into a unique format. As referenced above, the format is sometimes referred to herein as the HDX file format (or database). This nomenclature is not intended to be limiting. As will be seen, the HDX DB is a time-series, columnar, and schema-less storage format comprised of a root directly, and subdirectories containing so-called HDX files (preferably of three (3) distinct types) that are optimized for remote access. As will be described, this optimized file format allows the indexer service 108 to store the information (as the HDX DB) in the one or more cloud-based object stores 104 for efficient access and retrieval via a set of individual requests (typically, HTTP or HTTPS GET requests) that, collectively, comprise a search query. To this end, the basic operation of the search service is to receive a search query, interrogate the catalog service 114 to find potentially-relevant partitions of the time-series (stored in the remote data store(s)) to fetch, assign the identified partitions (for retrieval) to one or more computing resources (e.g., query peers), and then actively retrieve the HDX DB files (and their associated data) from the remote data store(s) for assembly into a response to the query. In one embodiment, the search service typically exposes an interface, e.g., a web interface, by which a query is formulated and executed. In an alternative embodiment, a query is generated automatically or programmatically, and then received for action (search and retrieval). By virtue of the HDX DB structure, queries can be of various types (e.g., full-text index, sequential access, random access, etc.). Without intending to be limiting, typically a query is designed for online analytical processing (OLAP), where reading a high volume of records (from the remote store(s))

is the common use case. The particular purpose of the query, and/or what is done with the information retrieved, however, are not a limitation of this disclosure.

During the data indexing process, preferably the indexer service builds (the HDX files described below) and stores them in the remote storage. On-demand, periodically or continuously, the merger service 112 (e.g., configured as a cluster of merger computing peers) examines the catalog of files in the remote storage (as identified by the catalog service 114) and configures jobs identifying files to be merged (in the cloud). Preferably, the merger service configures a merger job based on various factors, such as volume of data, network location, local processing resources, etc.

Referring back to FIG. 1, the search service 110 preferably comprises one or more stateless search or "query" peers. A query peer typically is a physical computing machine, or a virtual machine executing in a virtualized environment. For example, a physical computing machine is a rack-mounted server appliance comprising hardware and software; the hardware typically includes one or more processors that execute software in the form of program instructions that are otherwise stored in computer memory to comprise a "special purpose" machine for carrying out the query peer functionality described herein. Alternatively, the query peer is implemented as a virtual machine or appliance (e.g., via VMware®, or the like), as software executing in a server, or as software executing on the native hardware resources of some other system supported a virtualized infrastructure (such as a hypervisor, containers, and the like). Query peers may be configured as co-located computing entities or, more typically, as a set of distributed computing entities.

In addition, each of the other services (namely, the indexer, merger and catalog) may be implemented using machine architectures of this type. Given machines in the architecture may be dedicated to a particular service, or the machine implement multiple services. Further, multiple services (or, more generally, particular functions thereof) may be distinct or combined on a particular machine.

Figure 2:
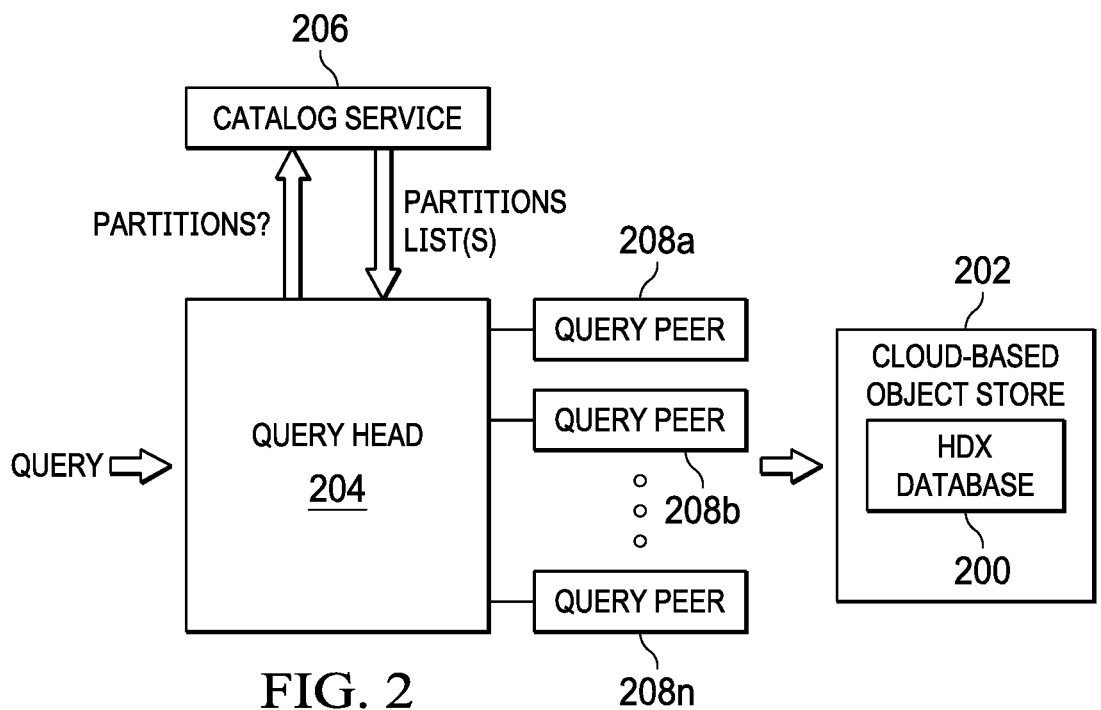
FIG. 2 is a high-level depiction of a technique for processing a query using a set of cooperating query peers according to one aspect of this disclosure.

Generalizing, and as depicted in FIG. 2, a query (to the HDX DB 200 hosted in the remote object store 202) can arrive from a user or other system to any query head 204. In response, the query head parses the received query and then consults with the catalog service 206 to determine the HDX partitions (typically, a set of one or more time-based partitions) to search. Typically, the determination of which partitions to search is determined based on a namespace the query is searching, as well as a time range specified in the query. Based on the data volume needed to search, the query head 204 will distribute the partition assignments to one or more query (search) peers 208a-n, thereby enabling a set of query peers to take part in executing the query. When multiple query peers are used, each query peer that will participate in evaluating the query is assigned as set of relevant HDX partitions that are needed for the search. Preferably, and when multiple query peers are used, the time-based partitions are spread evenly across a set of the peers, although this is not a requirement. As will be described, each peer then searches the HDX partition it was assigned, does a partial aggregation of the results, and then returns back the partial results to the query head 204 that is coordinating the overall response to the query. Once the query head receives the partial aggregate results from its peers, it performs a final aggregation and returns the result to the user as the response to the query.

The HDX file (storage) format is a highly-compacted format that generally contains an index, together with compacted raw data. This construct is now described. As previously mentioned, according to this disclosure HDX DB is a time-series, columnar, and schema-less storage format comprised of a root directory (or folder), and subdirectories (or subfolders) containing HDX files that are optimized for remote access. The "HDX" nomenclature is used merely for explanation (as a short-hand reference to the file format), but it is not intended to be limiting.

In a preferred embodiment, the directory structure is as follows:

```
<namespace>
   <day>
      part<0>
         manifest.hdx
         data.hdx
         index.hdx
      part<n>
```

Preferably, the indexer service creates a dictionary that contains all unique string values that are seen during the indexing process. In particular, the manifest file includes the dictionary of data strings seen in a column during indexing of the information, together with byte-range data configured to selectively retrieve data from the data and index files. The data file stores column data seen during the indexing, and the index file contains a listing (e.g., a posting-list) for each data string in the manifest file. In this approach, the column data is stored in the data file in contiguous byte-ranges.

Figure 3:
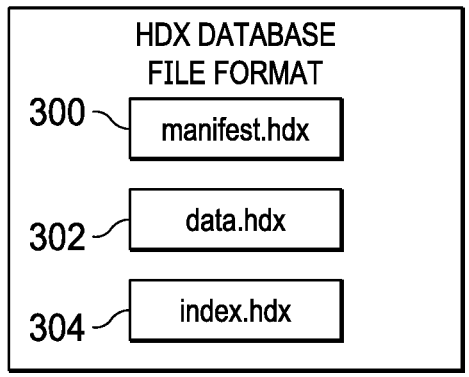
FIG. 3 depicts a representative structure of the HDX database file format of this disclosure.

FIG. 3 depicts the preferred HDX file format. As noted, the file "manifest.hdx" 300 preferably contains all of the information necessary to navigate the other HDX files, namely, the "data.hdx" file 302, and the "index.hdx" file 304. In particular, the manifest.hdx file 300 contains the unique strings dictionary that the data.hdx file 302 references. As will be described, this allows the search service (a query peer in particular) to download necessary blocks directly during a search and without having to seek and navigate the file to reach a particular block.

Figure 4:
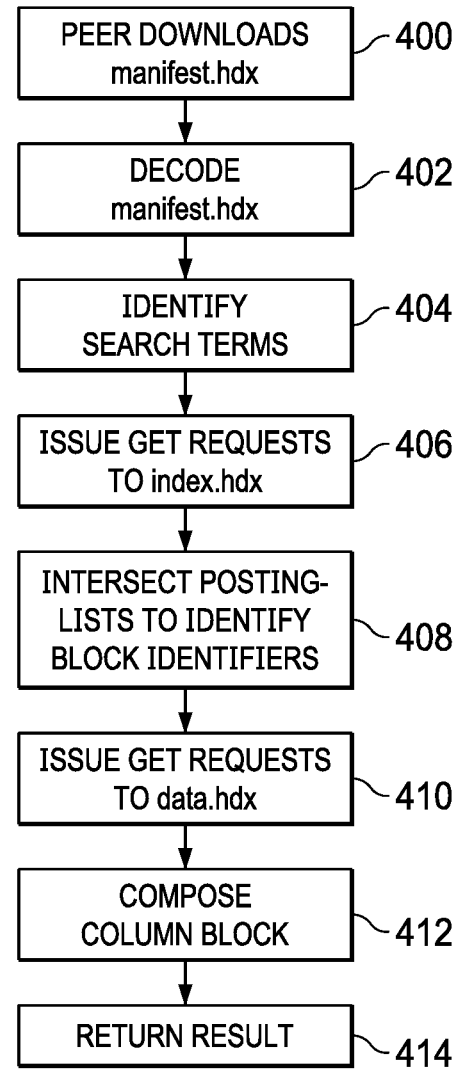
FIG. 4 depicts a process flow performed by a query peer in processing a time-based partition associated with a query.

More specifically, and with reference now to the process flow shown in FIG. 4 to search an HDX part for records matching given criteria in the query, at step 400 the search service downloads manifest.hdx if it is not found in local cache on disk (at the query peer). Then, at step 402, the manifest.hdx file is decoded lazily by first decoding block information arrays (offsets, types, sizes); at this step, the dictionary also is lazy decoded without decompressing the dictionary blocks. Using the dictionary, and at step 404, the terms to be searched are identified. At step 406, the query peer then issues HTTP GET requests on the index.hdx file to obtain the posting-lists for the terms found. At step 408, the posting-lists are then intersected to obtain final block identifiers (block_ids) in the data.hdx file that are needed to be fetched. At step 410, the query peer then issues GET requests to download the block_ids for each of blocks Once the block_id=x is received from each of the files in step 408, a ColumnsBlock is composed containing the sub-blocks at step 412. At step 414, the result is then passed on (e.g., to a query execution engine) for further processing. This operation also includes materializing each block and converting its identifier to the string value it references.

Generalizing the information search and retrieval is carried out by the search service. In response to a query, the search engine queries the catalog service, which identifies a list of partitions that are considered to contain data responsive to the query. Each of a set of query peers is then assigned to process a subset of the partitions identified in the list of time-based partitions returned from the catalog service. At a particular query peer, and for a given partition, preferably the following operations are then carried out. First, the manifest file for the given partition is retrieved from the remote store. Then, for the posting list data blocks in the index file so identified, one or more requests are then issued to the index file in the remote store to retrieve byte-ranges therein corresponding to the posting-list data blocks. The predicate specified in the query is then applied by finding an intersection of the posting-list data blocks, thereby identifying a set of data blocks in the data file for the given partition. For the set of data blocks in the data file so identified, one or more requests are then issued to the data file to retrieve the contiguous byte-ranges therein. The particular query peer receives the contiguous byte-ranges from the data file for the given partition, and consolidates data obtained from processing the subset of the partitions assigned to the particular query peer. Data derived by all of the query peers (collectively) is then consolidated and returned as the response to the query.

The following provides an example of the processing done by a particular query peer with respect to a query. In this example, it is assumed that the time-based data encodes a data set of web log information generated by a provider, and that the data is stored in a cloud-based object store, such as Amazon S3. As noted, the information may be stored across multiple cloud-based object stores, even those operated by distinct providers. The data set has been previously ingested and indexed to the object store in the manner previously described. In this example, the data set comprises columnar information such as time, customer identifier (cid), bandwidth (bw), status, geographic region, etc. A user now desires to query the data set to determine the aggregate bandwidth delivered for a particular customer (ABC) from servers in the United States (US) over the last month. The query might then be structured as follows:

SELECT SUM (bw) FROM provider WHERE cid="ABC" AND region="US" AND time=MONTH TO DATE GROUP BY 1.

It is assumed that the query is received at a main node (the QUERY HEAD). The retrieval operation then proceeds as follows:

STEP 1: The QUERY HEAD check with CATALOG (the previously-described catalog service) to find list of partitions (e.g., Amazon S3 directories) that contain data for NAMESPACE "provider," where TIME=MONTH TO DATE. As noted above, preferably a partition is some time-based segment of the namespace data.

STEP 2: The CATALOG returns a list of applicable partitions (e.g., 43,200 partitions). Inside each Amazon S3 directory, there are three (3) files, namely, manifest.hdx, index.hdx and data.hdx.

STEP 3: The QUERY HEAD distributes work to a pool of QUERY PEERS, assigning each one a subset of the partitions. Without limitation, a consistent hashing algorithm may be used for the partition assignment to optimize cache reuse.

STEP 4: The QUERY PEER downloads the manifest.hdx for a particular partition and memory-maps it. This file may already be present in local cache at the peer, in which case the download is not necessary.

Using manifest.hdx, the QUERY PEER then performs the following:

STEP 5: Use "cid" string dictionary to convert "ABC" into a numeric identifier (e.g., 456).

STEP 6: Use a "cid" column block in the manifest to identify the ("offset & sizes," or "byte-ranges") of the posting-list data blocks in index.hdx that contain (name=cid, value=456).

STEP 7: a COLUMN READER function does a DRY READ operation (a simulation) to identify dependencies to help order the issuing of requests.

STEP 8: The QUERY PEER either issues individual requests for each posting-list data block in index.hdx and/or consolidates them depending on their proximity. The posting-lists contain ("offset & sizes" or "byte-ranges") of the data.hdx data blocks that contain a particular ("term" or "name-value pair").

The same operations are then done for region='US'.

Using index.hdx, the QUERY PEER also performs the following:

STEP 9: The QUERY PEER applies the predicate specified in the query by finding the intersection of the two posting-lists. This operation generates the set of data blocks in data.hdx that contain both cid="ABC" AND region="US." The query peer now knows all of the data blocks that are needed. Preferably, the peer does not have to wait until all this data has been downloaded before beginning processing of the data. To that end, and to enable stream processing of the data, preferably the further processing tasks are broken down into a set of batches (e.g., 64 k-sized rows).

STEP 10: Before actually downloading the data itself, preferably a ROW BATCH READER function does a DRY READ on a batch to identify dependencies if any between or among the columns.

STEP 11: The QUERY PEER then issues individual or consolidated requests for data blocks for a particular batch in data.hdx. These blocks may contain extraneous data.

Using data.hdx, the query peer then performs the following:

STEP 12: The QUERY PEER processes the data. This step typically involves some additional processing. In particular, for an integer column, the values are decompressed. For a string column, the dictionary identifiers in data.hdx are converted back into strings. Because the dictionary itself is broken down into blocks, the system can optimize how much of it needs to be decompressed to respond to the particular query.

STEP 13: The QUERY PEER returns partial results to QUERY HEAD.

This completes the processing at the individual QUERY PEER. As noted above, typically the QUERY HEAD receives similar partial results from other QUERY PEERS, consolidates the received partial results, and generates a consolidated or aggregated response, which is then returned in response to the query.

Depending on the nature of the query (e.g., the relevant time period), the query peer that receives the query may execute the search (or some part of it) without spreading the query to multiple peers, although in the usual case the main node leverages a set of other query nodes.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the ingest, index, search and retrieval functions is non-transitory.

A given implementation of the disclosed subject matter is software written in a given programming language that runs on a server on commodity hardware platform running an operating system, such as Linux. As noted above, the above-described ingest, index, search and retrieval functions may be implemented as well as a virtual machine or appliance, or in any other tangible manner.

While given components of the system have been described separately, one of ordinary skill will appreciate that some of the functions may be combined or shared in given instructions, program sequences, code portions, and the like.

The functionality may be implemented with other application layer protocols besides HTTP/HTTPS, or any other protocol having similar operating characteristics.

There is no limitation on the type of computing entity that may implement the client-side or server-side of any communication. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What I claim is as follows:

1. A method of retrieving time-series columnar-based information, wherein the information comprises a set of time-based partitions that are stored across a cloud-based object store in directories each of which include a set of files, the set of files comprising a manifest file, a data file, and an index file, wherein the manifest file, the index file and the data file for a given partition together comprise a compact instance of a set of raw unstructured data that comprises the given partition, wherein the column data is stored in the data file in contiguous byte-ranges, comprising:

configuring a catalog identifying time-based partitions;
responsive to receipt of a query, querying the catalog to identify a list of partitions considered to contain data responsive to the query;
assigning each of a set of query peers to process a subset of the partitions identified in the list;
at each query peer of the set of query peers, and for a given partition, and without requiring retrieval of the data file as a whole, receiving contiguous byte-ranges from the data file;
consolidating data derived by all of the query peers to generate a response to the query; and
serving the response.

2. The method as described in claim 1 wherein manifest file includes a dictionary of data strings seen in a column during indexing of the information together with byte-range data configured to selectively retrieve data from the data and index files, the data file store column data seen during the indexing, and the index file contains a posting-list for each data string in the manifest file.

3. The method as described in claim 1 wherein the catalog is indexed according to a set of namespaces.

4. The method as described in claim 1 further including scaling a number of query peers in the set as necessary to process the query.

5. The method as described in claim 1 wherein the set of query peers is independent of the cloud-based object store.

6. The method as described in claim 1 wherein the retrieval is carried out on behalf of a tenant, the tenant being one of a set of tenants that use the cloud-based object store to store time-series columnar-based information.

7. The method as described in claim 1 further including caching the manifest file and the data blocks at the query peer.

8. An indexing and retrieval system for time-series columnar-based information, wherein the information comprises a set of time-based partitions, comprising:

a first service comprising computer program instructions executed in a first computing machine, the first computing machine including a hardware processor, to index the time-series columnar-based information as a set of files, the set of files comprising a manifest file, a data file, and an index file, wherein the manifest file, the index file and the data file for a given partition together comprise a compact instance of a set of raw unstructured data that comprises the given partition, the indexer service further configured to forward the set of files for each time-based partition to an object store, wherein the columnar-based information data is stored in the data file in contiguous byte-ranges; and
a second service comprising computer program instructions executed in a second computing machine, the second computing machine including a hardware processor, in response to a time-bounded query to identify a list of partitions considered to contain data responsive to the query, to assign each of a set of query peers to process a subset of the partitions identified in the list, and to consolidate data generated by each of the set of query peers into a response to the query, wherein, at a given query peer, a given partition is processed by receiving from the object store contiguous byte-ranges from the data file and without requiring retrieval of the data file as a whole.

* * * * *